March 7, 1961 G. P. THWAITES ET AL 2,973,787
METHOD OF WINDING GRID ELECTRODES
Filed Oct. 3, 1956 4 Sheets-Sheet 1

Inventor
G.P. THWAITES - H. DOWNING

By *Robert Harding jr*
Attorney

March 7, 1961   G. P. THWAITES ET AL   2,973,787
METHOD OF WINDING GRID ELECTRODES
Filed Oct. 3, 1956   4 Sheets-Sheet 4

Inventor
G.P. THWAITES-
H. DOWNING
By Robert Harding
Attorney

United States Patent Office 2,973,787
Patented Mar. 7, 1961

2,973,787
METHOD OF WINDING GRID ELECTRODES

George Percy Thwaites and Harold Downing, London, England, assignors to International Standard Electric Corporation, New York, N.Y.

Filed Oct. 3, 1956, Ser. No. 613,781

Claims priority, application Great Britain Oct. 7, 1955

4 Claims. (Cl. 140—71.5)

This invention relates to a method of winding individual grid electrodes for use in electric discharge devices. In known methods of winding grids, the lateral wires are wound on long lengths of the support wires, after which the support wires are cut into shorter lengths. In these methods it is the usual practice for small slots to be made across the support wires, into which slots the lateral wires are laid. These slots are then swaged over to hold the lateral wires in place.

In order that the winding of the lateral wire may be a continuous process the wire is wound along the whole length of support wires, but the cutting and swaging operation need only be carried out over the lengths of the support wires on which it is desired to form a grid.

The portions between the grids are thus wound with wire which is loose and which has eventually to be removed. This not only causes a waste of wire but introduces a handling operation. In addition a further operation is introduced by the need for cutting the support wires into short lengths to form separate grids. This last mentioned operation also has the disadvantage that if the tolerance placed on the lengths of the support wires for the separate grids is exceeded, and the grid is rejected, the preceding operations will have been wasted. Cutting the support wires into shorter lengths in this manner may produce support rods, the ends of which are deformed, and which may be difficult to insert in the holes in the supporting insulators.

The invention provides a method which reduces the handling operations required, avoids a large waste of wire between one grid and the next, and eliminates wastage caused by completed grids being rejected because the support rods are of the wrong length. It also enables support rods, the ends of which have been previously pointed, tapered or otherwise shaped so that they may enter easily into the holes in the supporting insulators, to be used.

According to the present invention there is provided a method of winding individual grid electrodes comprising the steps of locating at least two support rods in each of a plurality of mandrels, fixing a lateral wire to a support rod in one of said mandrels, rotating said one mandrel about its longitudinal axis and moving it along the said axis during rotation in order to wind the lateral wire along the length of the support rods located in it to wind a grid, fixing said lateral wire to the support rods upon which it is wound, fixing said lateral wire to a rod located in an adjacent one of said mandrels, and severing the lateral wire between said wound grid and the rod located in the adjacent mandrel.

The invention will now be described with reference to the accompanying drawings in which:

Fig. 1 represents schematically a plan view of a grid winding machine;

Fig. 2 shows a view of a machine which provides the facilities described with reference to Fig. 1, which view is partly in section on a line passing through the centre of the mandrels in positions 2 and 5, and partly in perspective. The view does not shown any part of the machine above the indexing plate 1;

Figure 1:
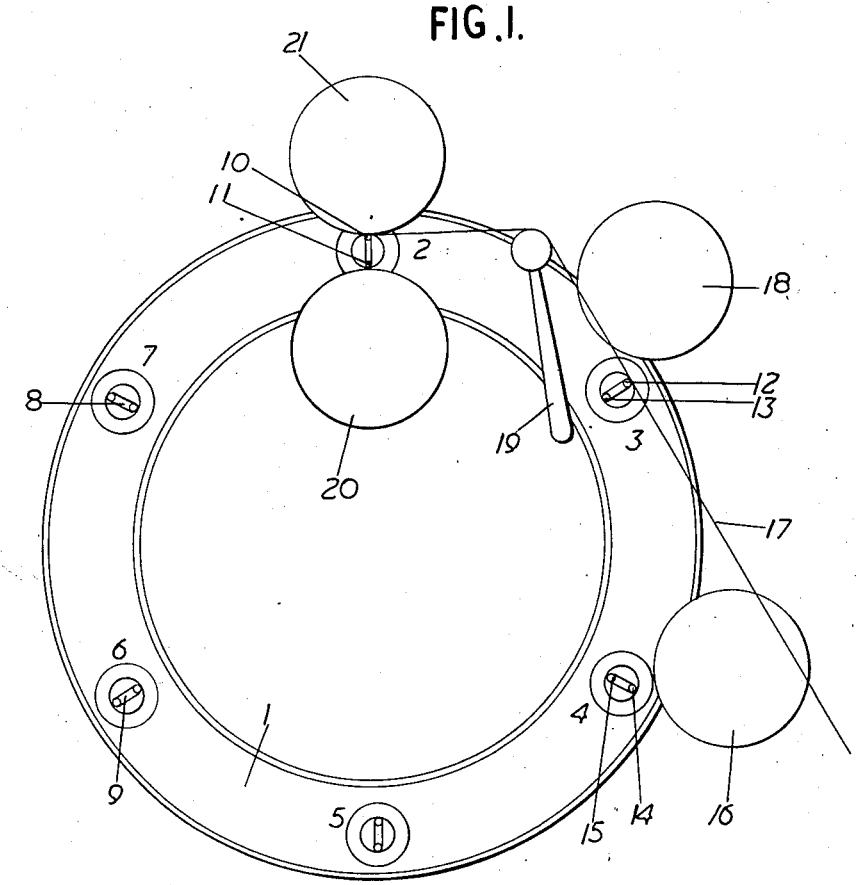

Referring to Fig. 1, an indexing plate 1 is shown on which are arranged in positions 2 to 7, and at regular intervals mandrels such as 8 and 9. Each of these mandrels may be loaded with grid support rods such as 10, 11; 12, 13; and 14, 15. The length of these rods having been previously checked. The plate 1 is arranged to rotate in an anti-clockwise direction in stages, so that each of the mandrels remains in the positions shown for a predetermined period of time. When rod 14 passes knife-edged wheel 16 a slot is cut in the rod by wheel 16. A similar slot has already been cut in rod 12 by wheel 16 and the lateral wire 17 for the grid is shown fed through the slot in rod 12 and fixed to rod 10.

When rod 10 was in position 3 the lateral wire 17 passed through a slot which had been cut in rod 10 by wheel 16. Then in moving from position 3 to position 2, a portion of rod 10 was swaged over, by wheel 18, on to wire 17 in order to fix the wire to the rod.

Lever 19 is sprung in order to maintain wire 17 under tension and is moved out of the way of the mandrels as they pass from position 3 to position 2.

When the mandrel carrying rods 10 and 11 reaches position 2, it is caused to rotate about its longitudinal axis and to move along its axis of rotation. At the same time wheel 20 cuts a slot in rods 10 and 11 once in each revolution of the mandrel. As the mandrel revolves wire 17 is fed into each new slot, and when it has been fed into a slot wheel 21 swages the rods over on to the wire.

When the grid shown in position 2 has been completed, the table moves round one position, and in moving from position 3 to position 2 the lateral wire is fixed to rod 12. It is now possible to sever the lateral wire between the completed grid now in position 7 and the grid waiting to be wound in position 2. The wound grid may then be ejected from position 7. A grid may thus be wound on each pair of support rods in turn in position 2.

Figure 2:
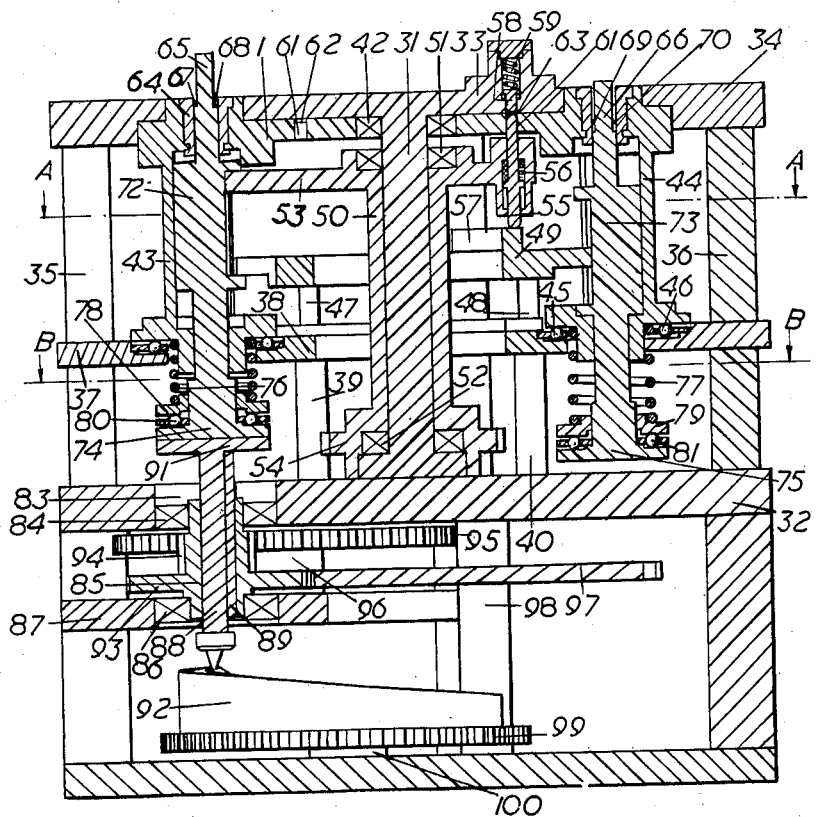

Referring to Fig. 2 a central shaft 31 is shown fixed at its base to a central plate 32. The shaft forms at its upper end an inner stationary plate 33. An outer stationary plate 34 is mounted upon pillars 35 and 36, upon which pillars an outer bearing ring 37 is also mounted. An inner bearing ring 38 is mounted upon pillars 39 and 40.

The indexing plate 1 is mounted at its centre by means of a bearing 42 on shaft 31, and is supported by downwardly projecting cylinders 43 and 44 which rest on bearings 45 and 46 on the inner and outer bearing rings respectively. The downwardly projecting cylinders 43 and 44 are two of six such cylinders arranged around the plate at regular intervals in positions corresponding to positions 2 to 7 of Fig. 1. These cylinders are hollow and have portions facing the central shaft cut away. Mounted upon pillars 47 and 48 is a locking ring 49. Around the shaft 31 is mounted a sleeve 50 upon bearings 51 and 52. Sleeve 50 provides at its upper end a plate 53 and at its lower end a toothed wheel 54. The drive for the rotary motion of the apparatus is applied to wheel 54. On plate 53 there is mounted an indexing plunger 55 which is pressed downwards by spring 56 and is shown riding on cam 57 which forms part of locking ring 49. Mounted upon the stationary plate 33 is a locking plunger 58 which is downwardly sprung by means of spring 59. This plunger is situated immediately above the top of the rise in cam 57. Plate 1 has in its underside a cam track 61 in which the top of plunger 55 rides. At six equiangular points this cam track extends through the plate in order to provide holes such as 62 and 63 into which plunger 58 may pass. At each of these points plate 1 is locked to stationary plate 33 by plunger 58 passing through these holes in plate 1. This is arranged to occur at each of the positions 2 to 7 shown in Fig. 1. When plunger 55 is moved round by the movement of plate 53 and reaches the top of cam 57 it is raised to its highest point in cam track 61 and ejects the locking plunger 58 from the hole 63 in plate 1. At the same time the plunger 55 abuts against a stop in the cam track and causes plate 1 to be moved round with plate 53. When the next position is reached plunger 55 drops off the end of cam 57 and at the same time locking plunger 58 enters the next hole and locks plate 1 to plate 33, while plunger 55 continues to move in cam track 61.

Around the plate 1 in positions 2 to 7 shown in Fig. 1 there are six holes. In each of these holes there is a bush such as 64 and through these bushes pass mandrels as shown at 65 and 66. The mandrels are provided with holes 67, 68, 69 and 70 into which grid support rods may be placed. The mandrels are attached to cylindrical shafts 72 and 73 which are movable up and down and are rotatable within cylinders 43 and 44. Curved portions are cut out of these shafts and into these portions both plate 53 and locking ring 49 may pass. The lower ends of these shafts form clutch plates 74 and 75, and the shafts are urged in a downward direction by springs 76 and 77 acting on these plates via flanges 78 and 79 and thrust bearings 80 and 81.

Immediately beneath the clutch plate 74 in position 2 there is a hole 83 in central plate 32. In this hole there is mounted on bearing 84 one end of a shaft 85. The other end of shaft 85 is mounted on bearing 86 in a hole in plate 87. Shaft 85 has a central hole and keyway through which passes a spline shaft 88. The spline 89 allows the shaft 88 to move vertically independently of shaft 85, but ensures that it is keyed to it for rotary movement. The upper end of shaft 88 forms a clutch plate 91 which is shown in engagement with plate 74. The lower end of shaft 88 is shown in a perspective view riding at the top of cam 92. A drive from a gear attached to an external motor may be applied to gear 93 which forms part of shaft 85. This drive is also applied via gear 94 also on shaft 85 to gear 95 mounted on spindle 96, via a gear not visible mounted on spindle 96 to gear 97 mounted on spindle 98, and thence via another gear not visible mounted on spindle 98 to gear 99, which is mounted on spindle 100. Upon gear 99 is mounted cam 92. Spindle 98 has an extension not shown which passes through a hole in plate 32 and provides a drive to gear 54.

Figure 3:
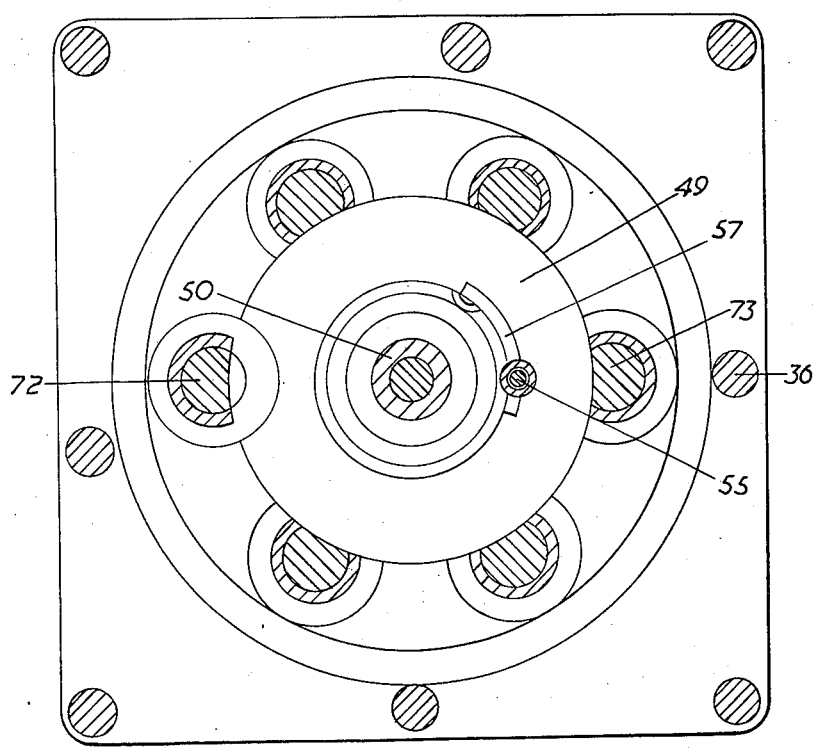
Fig. 3 shows a section of the whole machine on the line AA in Fig. 2 looking towards the base.

Referring to Fig. 3 there is shown the locking ring 49 which is fixed and the edge of which fits into the curved cut-out portions in the cylindrical shaft such as 73. A portion cut out of ring 49 in position 1 allows shaft 72 to rotate, while the shafts in the other positions are prevented from rotating. Projecting from ring 49 is cam 57 upon which plunger 55 rides as sleeve 50 is rotated.

Figure 4:
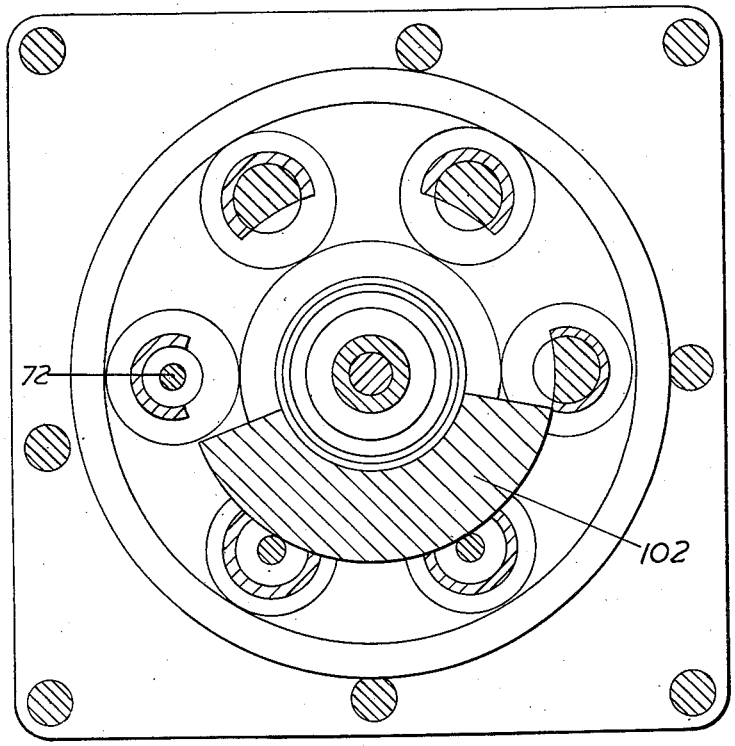
Fig. 4 shows a section of the whole machine on the line BB in Fig. 2 looking towards the base.

Referring to Fig. 4 there is shown a plate 102 (not visible in Fig. 2) and upon which the lower edges of the widest portions of the shafts such as 72 rise when passing from position 2 through position 7 to position 6. The shaft 72 in position 2 is held raised either by the action of shaft 88 (shown in Fig. 2) or by the segment of plate 53 which is shown in Fig. 2 passing into the cut-out portion of shaft 72.

The operation of the machine will now be explained with reference to all of the foregoing drawings.

The mandrels in each of the positions 2 to 7 (Fig. 1) are loaded with grid support rods, and slots are cut in the sides of support rods 12 and 10. A lateral wire 17 is fed through the slot in support rod 12 and swaged into the slot in support wire 10. Support rods 10 and 11 are in holes in a mandrel which is shown as mandrel 65 in Fig. 2. A drive is applied continuously through a gear (not shown) to gear 93 so that plate 53 rotates continuously, via the gearing previously described. At the stage shown in Fig. 2 stationary plate 53 is disengaged from plate 1 by the action of plunger 55 rising on cam 57 and ejecting plunger 58 from hole 63 in plate 1. As plunger 58 is ejected from hole 63 clutch plate 91 disengages from clutch plate 74 because cam 92 has rotated so that spline shaft 88 may drop. Plunger 55 now abuts against the stop in cam track 61 and causes plate 1 to rotate in an anti-clockwise direction together with plate 53 to the next position. Shaft 72 is held raised in the position shown, either by the segment of plate 53 which is shown in Fig. 2 passing into the cut out portion of shaft 72, or by the plate 102 (Fig. 4) upon which the lower edge of the widest portion the shaft rests.

When the next position is reached the plunger 55 drops off cam 57, plate 1 no longer rotates and plunger 58 enters the hole in plate 1 and locks it. During this time cam 29 has rotated so that spline shaft 88 is raised on cam 92 to engage clutch plate 91 with the clutch plate of the new shaft now in position 2. The lateral wire 17 has been swaged into a slot in a support wire located in the mandrel now in position 2, and the wire 17 between the mandrel now in position 2 and the mandrel which was previously in position 2, has been broken. The wire may be severed by cutting it automatically by means of devices placed near positions 2 and 7 and then removed, or it may be burnt away.

The mandrel which was in position 2 (Fig. 1) now holds a wound grid which is not connected to the wire 17 and which may be removed from the mandrel, when in either positions 5, 6, or 7. The wire 17 from the mandrel now in position 2 passes through the slot which was cut in one of the support rods now in position 3 as it passed from position 4 to position 3. As the spline shaft 88 is raised by the rotation of cam 92 it is rotated by the drive on gear 93 and the mandrel 65 is thus raised and rotated. During this operation the support rods in position 2 have slots cut in them by wheel 20 and after the wire 17 has been fed into each slot the support rod is swaged over by wheel 21 to hold the wire firmly as explained with reference to Fig. 1.

The cam 92 is arranged so that the clutch plates 91 and 74 disengage a little less than half a turn before the required number of turns has been wound. At this point the segment of the plate 53 shown in Fig. 2 enters the cut out portion of shaft in position 2 and completes the turn but prevents the shaft from turning any further. The mandrel thus rotates no further and at this point the final turn is swaged into the support rod. The plunger 55 riding on cam 57 ejects the locking plunger 58 from the hole in the plate 1 so that the plate 1 is indexed to the next position and the winding operation is recommenced.

At positions 7, 6 and 5 means may be provided to comb, heat treat, and stretch the grid, in which case at position 5 means may also be provided to remove the grid automatically from the mandrel.

Although in the embodiment described the machine used shows positions of the mandrels at regular intervals around a circular plate, they may quite easily be arranged in some other fashion, for example at regular intervals along a belt.

The pitch of the grid wound depends upon the slope of the cam 92 and the ratio of the gears. In the embodiment described this cam and the gears are housed beneath the main unit, and it is possible to change either of them easily, without affecting the upper part of the machine, in order to alter the pitch of the grid. In addition by varying the scope of cam 92 the pitch of the grid may be varied along its length.

In the embodiment described the lateral wire is attached first to the upper part of a support rod and the grid is then wound from the top downwards. There is no reason why, with a suitable mechanical rearrangement, the grid should not be wound from the bottom to the top without departing from the scope of the invention. By changing the direction of rotation of the mandrels either left or right handed grids may be wound.

In an alternative arrangement it is possible to keep the plate upon which the mandrels are arranged still, and to move the driving shaft and clutch and the lateral wire and slotting and swaging wheels around the plate.

Figure 5:
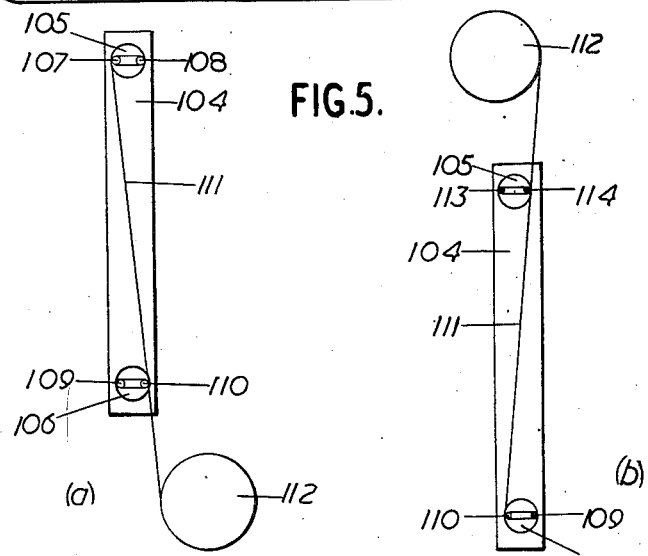
Fig. 5 shows diagrammatically a plan view of a machine which provides an alternative arrangement for winding individual grid electrodes.

In a further arrangement illustrated in Fig. 5 a method is shown of winding grids alternately on two mandrels which remain in the same positions relative to one another.

Referring to Fig. 5 at (a) there is shown a plan view of a fixed plate 104 upon which is mounted two mandrels 105 and 106. The mandrels are rotatable but remain in the same relative positions on the plate. Four support rods 107 to 110 are placed in the mandrels which are similar to those described with reference to Fig. 2. Lateral wire 111 is passed from spool 112 through a slot in rod 110 and fixed to rod 107. Mandrel 105 is then rotated in a clockwise direction and moved along its axis of rotation, and cutting and swaging wheels (not shown) are used to fix the lateral wire to the support rods in the manner described with reference to Fig. 1. When the grid has been wound on rods 107 and 108, the lateral wire is fixed in the slot in rod 110, and the wire between rods 107 and 110 is broken. The wound grid is then ejected from mandrel 105.

At (b) the next stage of the operation is shown. Mandrel 105 has been reloaded with support rods 113 and 114, spool 112 has moved along the side of the mandrels from one end of plate 104 to the other, and mandrel 106 has rotated half a turn anticlockwise. Wire 111 fixed to rod 110 is now fed from spool 112 through a slot in support rod 114. Mandrel 106 is then rotated in an anticlockwise direction and moved along its axis of rotation until a grid has been wound upon rods 109 and 110 in the same manner as the previous grid was wound. When wire 111 has been fixed to rod 114 the wire between 114 and 110 is broken, the new grid is ejected and the arrangement shown at (a) is set up again with a new pair of support rods in mandrel 105.

Although in all of the embodiments described the lateral wire has been shown as being fixed to the support rods by means of a slotting and swaging operation there is no reason why it should not be fixed by some other means such as welding. In which case instead of being fed through a slot in a rod of an adjacent pair the wire would be fed so that it passes against the said rod. In addition although in the description grids having only two support rods have been described, the method may be used to wind grids having three, four or even more support rods if required.

While the principles of the invention have been described above in connection with specific embodiments, and particular modifications thereof, it is to be clearly understood that this description is made only by way of example and not as a limitation on the scope of the invention.

What we claim is:

1. A grid winding machine comprising a rotatable support, a mandrel mounted on said support, said mandrel being adapted to carry grid supporting rods thereon, means for rotating said rotatable support through a plurality of angular positions, means for initially cutting a slot in one of said support rods at a first one of said angular positions of said rotatable support, means for supporting the grid wire being fed into said machine tangentially of said rotatable support in the path of the slot cut in said support rod as said rotatable support rotates, means for inserting said wire to said last named support rod in a second angular position of said rotatable support, means at a third angular position for rotating said mandrel about its longitudinal axis support, means simultaneously operating with said rotating means for providing a relative longitudinal movement between said fed wire and said mandrel for winding said wire along the length of said support rods of said mandrel.

2. Apparatus of claim 1, further comprising means at said third angular position for cutting slots in said support rods as said mandrel rotates, means for fixing the wire in the slots of said support rods as said mandrel rotates.

3. Apparatus of claim 1, wherein a spline shaft and sloping cam are connected to a mandrel for varying the pitch of the grid windings on the support rod throughout its length.

4. The apparatus of claim 1, wherein a circular cutter and a swaging wheel is located contiguous to said mandrel and a swaging wheel is located contiguous to an adjacent mandrel at said third angular position.

References Cited in the file of this patent

UNITED STATES PATENTS

| | | |
|---|---|---|
| 1,646,258 | Raus | Oct. 18, 1927 |
| 1,874,575 | Morick | Aug. 30, 1932 |
| 2,034,653 | Flaws | Mar. 17, 1936 |
| 2,610,387 | Borland | Sept. 16, 1952 |
| 2,670,705 | Herrold | Mar. 2, 1954 |
| 2,698,478 | Heisterkamp | Jan. 4, 1955 |
| 2,759,499 | Gartner | Aug. 21, 1956 |
| 2,785,867 | Gallagher | Mar. 19, 1957 |

FOREIGN PATENTS

| | | |
|---|---|---|
| 1,018,252 | France | Oct. 15, 1952 |